(12) United States Patent
Di Marsciano et al.

(10) Patent No.: US 11,903,360 B2
(45) Date of Patent: Feb. 20, 2024

(54) MACHINERY AND METHOD OF PRODUCTION OF PASTA FILATA CHEESES

(71) Applicant: MIRABILIE MUNDI CIBI S.R.L., Rome (IT)

(72) Inventors: Andrea Di Marsciano, Rome (IT); Paolo Di Puorto, Rome (IT)

(73) Assignee: MIRABILIE MUNDI CIBI S.R.L., Rome (IT)

( * ) Notice: Subject to any disclaimer, the term of this patent is extended or adjusted under 35 U.S.C. 154(b) by 267 days.

(21) Appl. No.: 17/422,552

(22) PCT Filed: Jan. 13, 2020

(86) PCT No.: PCT/IB2020/050219
§ 371 (c)(1),
(2) Date: Jul. 13, 2021

(87) PCT Pub. No.: WO2020/148622
PCT Pub. Date: Jul. 23, 2020

(65) Prior Publication Data
US 2022/0095578 A1 Mar. 31, 2022

(30) Foreign Application Priority Data
Jan. 16, 2019 (IT) .......... 102019000000681

(51) Int. Cl.
*A01J 25/00* (2006.01)
*A01J 25/12* (2006.01)
(Continued)

(52) U.S. Cl.
CPC ............. *A01J 25/008* (2013.01); *A01J 25/12* (2013.01); *A23C 19/0684* (2013.01);
(Continued)

(58) Field of Classification Search
CPC ........ A01J 25/00; A01J 25/002; A01J 25/008; A01J 25/12; A01J 25/123; A01J 25/13;
(Continued)

(56) References Cited

U.S. PATENT DOCUMENTS 3,528,821 A * 9/1970 Stenne .................. A01J 25/002
426/40
4,592,274 A * 6/1986 Tomatis ................ A01J 25/008
99/452
(Continued)

FOREIGN PATENT DOCUMENTS

| EP | 0 124 163 | 11/1984 |
|---|---|---|
| EP | 0 186 795 | 7/1986 |

(Continued)

OTHER PUBLICATIONS

Johnson, Kate; "RENNET: Types, Techniques & Testing"; The Art of Cheese; Aug. 15, 2016 https://theartofcheese.com/rennet-types-techniques-testing/ (Year: 2016).*
(Continued)

*Primary Examiner* — Drew E Becker
*Assistant Examiner* — Austin Parker Taylor
(74) *Attorney, Agent, or Firm* — NIXON & VANDERHYE

(57) ABSTRACT

Machinery for the production of pasta filata cheeses includes a preparation cell that receives, moves, and heats raw material, the raw material being rennet, and then transfer the heated rennet to a spinning cell that adds water and steam. Next the mixture is moved and heated to a desired density and then transferred, as paste, to a forming cell, the forming cell being provided with timed augers and a thermometer to determine the moment in which to push the paste into a forming drum.

20 Claims, 4 Drawing Sheets

(51) Int. Cl.
*A23C 19/068* (2006.01)
*A23C 19/09* (2006.01)
*F25D 19/00* (2006.01)
*G01G 17/06* (2006.01)

(52) U.S. Cl.
CPC .............. *A23C 19/09* (2013.01); *F25D 19/00* (2013.01); *G01G 17/06* (2013.01); *A23C 2250/10* (2013.01)

(58) Field of Classification Search
CPC . A23C 19/0684; A23C 19/09; A23C 2250/10; F25D 19/00; G01G 17/06; A47J 43/04; A47J 43/044–0722; A47J 43/08–087; A23L 5/10
USPC .......... 426/36, 38, 39, 40, 231, 582; 99/452, 99/453, 460–462
See application file for complete search history.

(56) References Cited

U.S. PATENT DOCUMENTS

| | | | |
|---|---|---|---|
| 4,669,254 A | 6/1987 | Muzzarelli | |
| 5,431,946 A * | 7/1995 | Vesely | A23C 19/09 426/38 |
| 5,902,625 A * | 5/1999 | Barz | A23C 19/093 426/654 |
| 8,221,816 B1 * | 7/2012 | Leffelman | A01J 25/008 426/582 |
| 2008/0131570 A1 * | 6/2008 | Bokelmann | A01J 25/04 426/519 |
| 2012/0097048 A1 * | 4/2012 | Tomatis | A01J 25/008 99/453 |
| 2015/0143832 A1 * | 5/2015 | Jeong | A01J 25/12 62/135 |
| 2015/0289532 A1 * | 10/2015 | Chiba | A23C 19/052 426/39 |
| 2015/0320067 A1 * | 11/2015 | Bryson | A23C 19/082 426/582 |
| 2017/0079302 A1 * | 3/2017 | Lotode | A23C 19/05 |
| 2017/0099851 A1 * | 4/2017 | Lindgren | A01J 25/12 |
| 2017/0258031 A1 * | 9/2017 | Tomatis | A01J 25/008 |

FOREIGN PATENT DOCUMENTS

| | | | |
|---|---|---|---|
| FR | 2900025 A1 * | 10/2007 | A01J 25/12 |
| JP | 2015-039313 | 3/2015 | |
| KR | 2012072874 A * | 7/2012 | |
| WO | WO-9306717 A1 * | 4/1993 | A01J 25/11 |
| WO | WO-9953749 A1 * | 10/1999 | A01J 25/008 |
| WO | 2014/102711 | 7/2014 | |
| WO | 2017/157785 | 9/2017 | |

OTHER PUBLICATIONS

International Search Report for PCT/IB2020/050219 dated Mar. 27, 2020, 4 pages.
Written Opinion of the ISA for PCT/IB2020/050219 dated Mar. 27, 2020, 6 pages.

* cited by examiner (a)

(b)

(a)　　　　　　　　　　　(b)

(a)　　　　　　　　　　　(b)

MACHINERY AND METHOD OF PRODUCTION OF PASTA FILATA CHEESES

CROSS-REFERENCE TO RELATED APPLICATIONS

This application is the U.S. national phase of International Application No. PCT/IB2020/050219 filed Jan. 13, 2020 which designated the U.S. and claims priority to Italian Application No. 102019000000681 filed Jan. 16, 2019, the entire contents of each of which are hereby incorporated by reference.

BACKGROUND OF THE INVENTION

Field of the Invention

The present invention relates to the field of automated food production systems, in particular dairy products and even more specifically mozzarella.

Description of the Related Art

In the current art, the production of pasta filata dairy products, such as mozzarella, has an almost completely handmade process. It follows that the quality of the product depends on multiple factors, as well as on the quality of the raw material used, which are not currently controlled by machinery, but are empirically kept under control by the personnel who perform the various processing steps based on one own's experience.

A process carried out by trial and error, in an artisan style, risks making each finished product different from the other, undermining the quality and recognizability by the consumer.

In the field of mozzarella production, there are also international patents aimed at automating its production according to preset parameters.

An example is the Japanese patent JP2015039313 entitled *"Kit for producing mozzarella cheese"* which aims to provide an easy method suitable for the manual and home production of a mozzarella. The solution identified provides a kit comprising, in addition to a manual which describes the procedure, also at least two or more packets of citric acid and rennet. To carry out all the required steps it is necessary to use a common microwave oven. The production process comprises a heating curdling step separated from the whey for a predetermined period of time in a microwave oven and a kneading step of the curd.

Another patent, extended worldwide but of Italian origin and owned by the well-known company "Granarolo", published under the number WO2014102711, describes a flavoring mixture comprising partially fermented liquid milk, obtained through the development of an association of lactic ferments and yeasts until reaching a pH between 5.7 and 6.5 and its use in the industrial production of mozzarella. This flavoring mixture is able to give mozzarella a stronger flavor, typical of artisan-produced mozzarella.

It is clear that the two aforementioned inventions, as well as the others currently in force at national and international level, are not able to solve the problem raised by the applicant of the present patent and brilliantly solved by the invention described below.

SUMMARY OF THE INVENTION

According to the present invention, a machine is provided and a method of use is described for the production of pasta filata cheeses, preferably mozzarella, even more preferably buffalo mozzarella, effectively solving the above problems.

Advantageously, the machinery described below allows the production of cheeses all having the same quality standard, since their production takes place following scientifically recognized parameters and no longer the experience of the operator who left a certain degree of uncertainty on the quality of the product.

The mechanical components of the machinery are at least the following:

a preparation or maturation cell which must be loaded with a predetermined quantity of specially prepared raw material, move it and heat it up to a given temperature. The movement is entrusted to at least a couple of augers each associated with a timed geared motor. The achievement of the expected temperature is given by the presence of a cavity in which thermostatic water is moved, always kept at the same temperature by a thermometer and a heating system.

A spinning cell capable of receiving a predetermined quantity of raw material leaving the preparation cell, adding water and steam at controlled temperature according to predetermined parameters depending on the quantity of raw material entering and moving the resulting mixture until obtaining the desired density. Said spinning cell advantageously comprises an electric energy absorption sensor adapted to measure the quantity of energy absorbed by the mixture movement augers to trace the density of the material being processed. To better carry out the movement according to pre-established parameters, the two augers with which the spinning cell is provided are of the bidirectional type and are independent of each other. The whole spinning step can advantageously be controlled by an operator through a transparent porthole placed on the lid of said spinning cell. Preferably, a pH meter will also be installed in the spinning cell.

A forming cell adapted to receive the paste coming from said spinning cell by means of a drop system in which a door of the spinning cell opens and causes the spinning cell product to slide, assisted by the thrust of the augers, completely or partially in the forming cell. Here, too, the paste is moved by at least a pair of bidirectional augers coupled together, each of which associated with a timed geared motor. The temperature of the paste is kept under control by a thermometer which determines the moment in which the augers push said paste into a forming drum adapted to give the desired shape to the finished product and to expel it from the machinery. Preferably, a pH meter will also be installed in the forming cell. In an even more advantageous embodiment of the present invention, the forming cell comprises a plurality of ingredient injectors, consisting of mechanized compressed air operated syringes adapted to pierce the cheese being formed to fill it with at least one other ingredient. In this way, the cheeses produced can be advantageously stuffed with other flavors that go well with that of cheese.

A control unit, which is the most important part of the machinery as it contains dedicated software capable of setting and monitoring the production parameters to obtain a finished product with the exact organoleptic characteristics required by the quality standards imposed. Advantageously, this control unit receives all the data detected by all the thermometers and pH meters present and also by the electric energy absorption sensor installed in the spinning cell, together with all the possible sensors that a man skilled in the art could easily install on the machinery of the present invention. Depending on the type of cheese one wants to make, by processing the aforementioned data, the control unit acts on the geared motors of the augers to operate the movement of the pasta filata and on the heating systems to obtain the temperatures expected in each processing step. In the embodiment of the machinery comprising the ingredient injectors, the control unit also controls the moment in which said injectors have to pierce the surface of the cheese in production to reach its core and fill it with another flavor. This moment is given by the temperature of the cheese which, if stuffed still hot, then closes again, exhibiting a smooth outer surface without holes.

A communication interface consisting of a common display, preferably a touch screen, for communicating to an operator the parameters detected by said control unit and possibly modifying them manually.

Advantageously, the forming drum, which determines the shape of the cheese leaving the machine, can be quickly replaced with other forming drums which model the product according to different shapes. Advantageously, once the drum is installed on the relative indented shaft, the constraint is ensured by a common mechanical locking device.

The method of use of the machinery described so far is very simple for the operator who, in this way, does not require any particular experience in the sector. After preparing the raw material, it is poured into the spinning cell, opening the lid and transferring it to the tank. From here the whole process is fully automated until the finished product is expelled from the machine. Through the communication interface, the operator can select a preset program for the production of the desired type of pasta filata cheese. According to the desired shape, the corresponding forming drum is installed and then the machine is started. During production, the operator can visually monitor the spinning step thanks to the transparent porthole of the lid and can view all the necessary parameters through said communication interface. He can also possibly edit them manually.

An even more advantageous embodiment of the subject machinery provides upstream of the preparation cell also at least one cold room in which the rennet is stored and kept until production.

Preferably, said preparation tank is also provided with a scale adapted to monitor the quantity of raw material being prepared and the quantity conveyed into the spinning cell.

If a cold room is advantageously also present, mechanical means for picking up the refrigerated rennet and transferring it to the preparation cell will also be advantageously provided. There may also be a negative cold room (i.e. adapted to store food at temperatures below zero) and a positive cold room (i.e. adapted to store food at temperatures above zero). The rennet will then be first stored in the negative cold room and then picked up and placed in the positive cold room until thawed. At this point it can be taken and placed in the preparation tank to then undergo the treatment described above.

The advantages offered by the present invention are clear in the light of the above description and will be even clearer from the accompanying figures and the related detailed description.

BRIEF DESCRIPTION OF THE DRAWINGS

The invention will hereinafter be described in at least one preferred embodiment thereof by way of non-limiting example with the aid of the accompanying figures, in which.

DESCRIPTION OF THE PREFERRED EMBODIMENTS

The present invention will now be described purely by way of non-limiting or binding example with the aid of the figures, which illustrate some embodiments relative to the present inventive concept.

Figure 1:
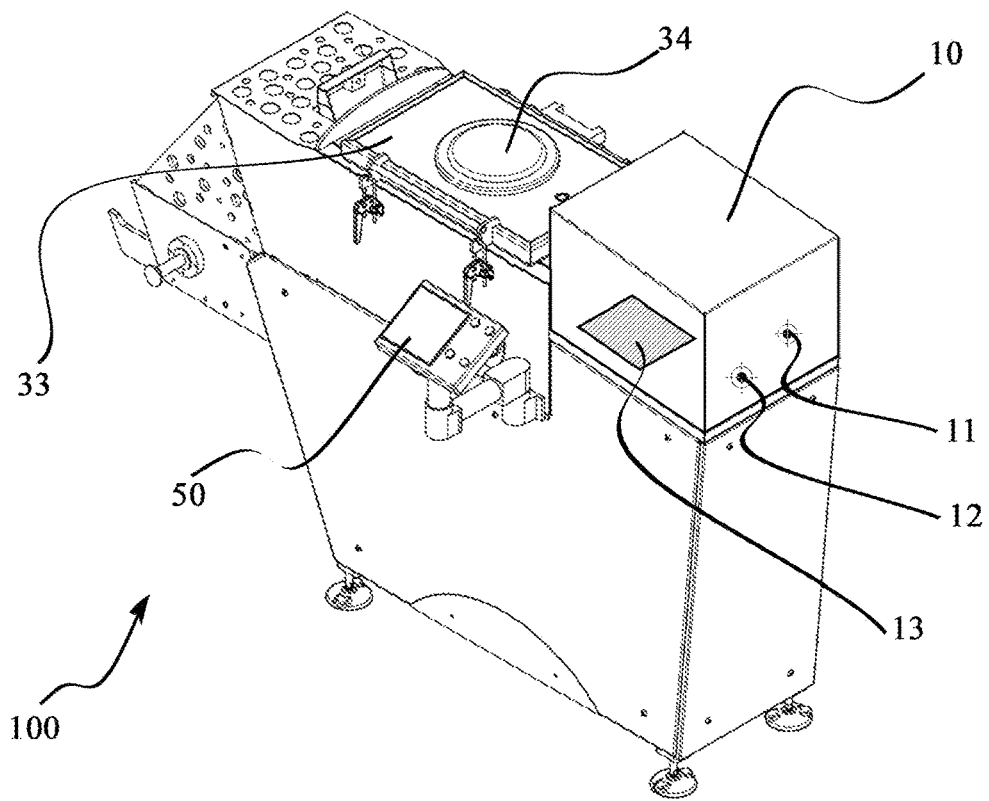
FIG. 1 shows two three-dimensional views (1 (a) and 1 (b)) of machinery 100.
Figure 1:
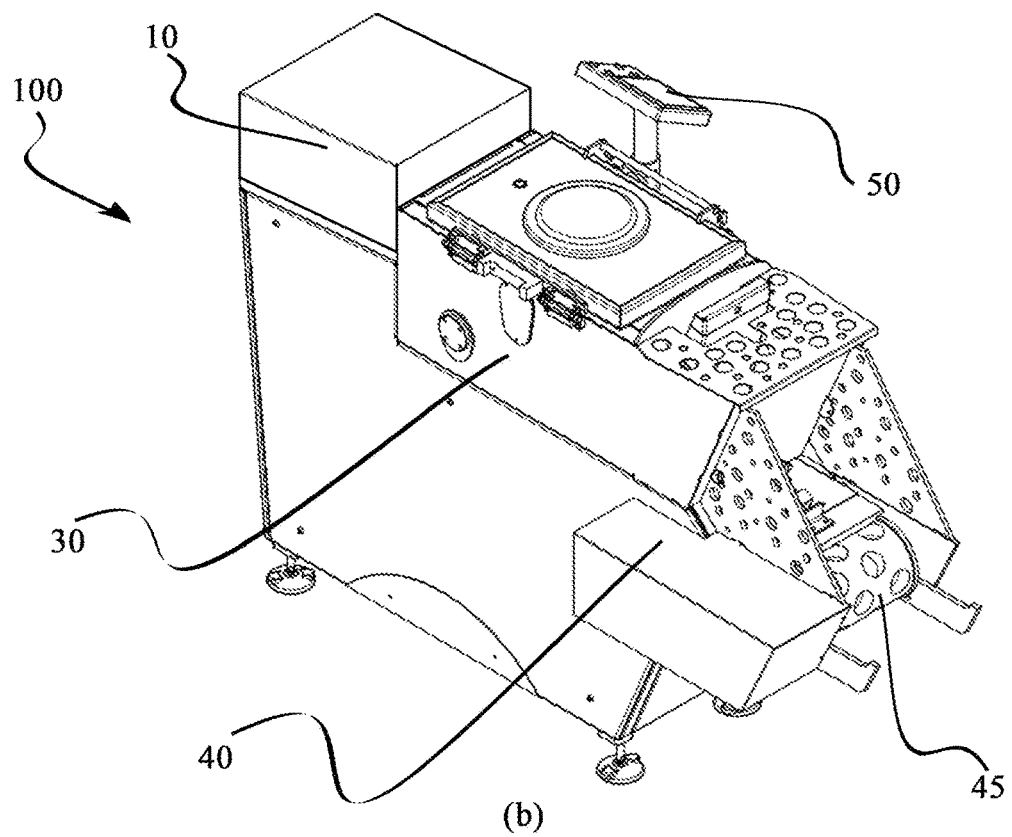

With reference to FIG. 1, generic views of one of the preferred embodiments of the machinery 100 object of the present invention are shown.

It comprises, as technical units, a preparation cell 10, a spinning cell 30 and a forming cell 40 from which the buffalo mozzarella comes out according to formats imposed by the mechanical features of the forming drum 45 installed downstream of the forming cell 40.

The preparation tank 10 is the first to be used in the correct sequence of the method of use of such machinery 100.

It comprises a thermometer, a pH meter and a scale which are all in data connection with the control unit which manages the automatic operation of the machinery 100 starting from settings entered by an operator via a communication interface 50. Through the thermometer 11 and the pH meter 12, the control unit is able to understand when the mixture is ready to be processed without compromising the quality of the outgoing mozzarella.

The heating of the raw material introduced into the preparation cell 10 is due to the presence of a heating system adapted to keep water at a predetermined temperature.

Through the scale 13, the control unit is able to understand the quantity of raw material received in a machine loading step performed by an operator and the quantity that must be conveyed from the preparation tank 10 to the spinning cell 30. The transfer takes place by common mechanical means, automated and controlled by said control unit. In more detail, a hatch automatically opens from the preparation cell 10 and the product falls by gravity into the spinning cell 30 also driven by the action of the augers.

Figure 2:
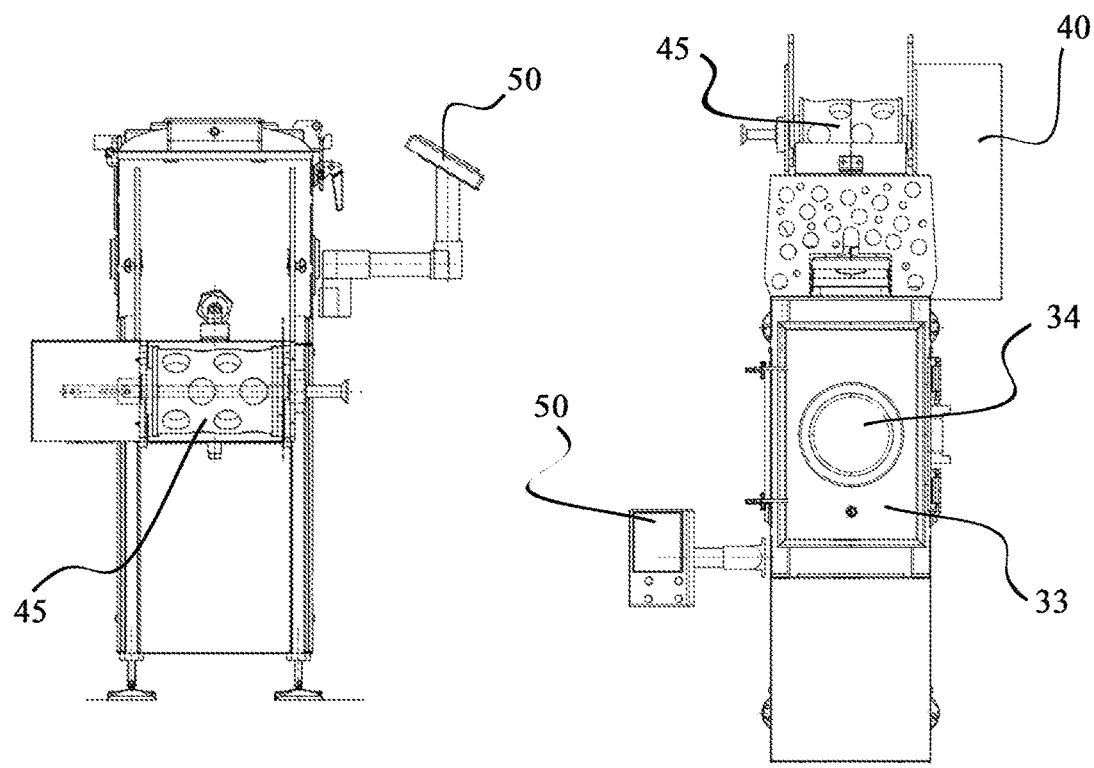
FIG. 2 shows the front elevation (2 (a)), the top view (2 (b)) and the lateral elevation (2 (c)) of a machinery 100 in which, for greater clarity in the drawing, the preparation cell 10 is not shown.
Figure 2:
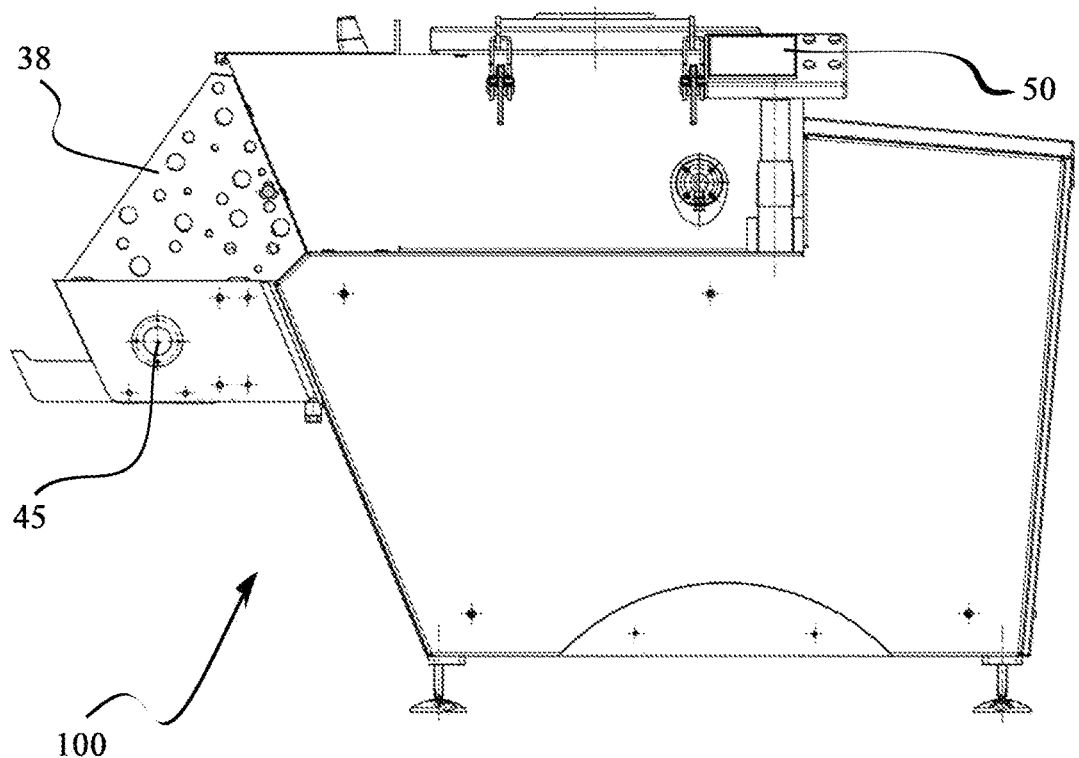
Figure 3:
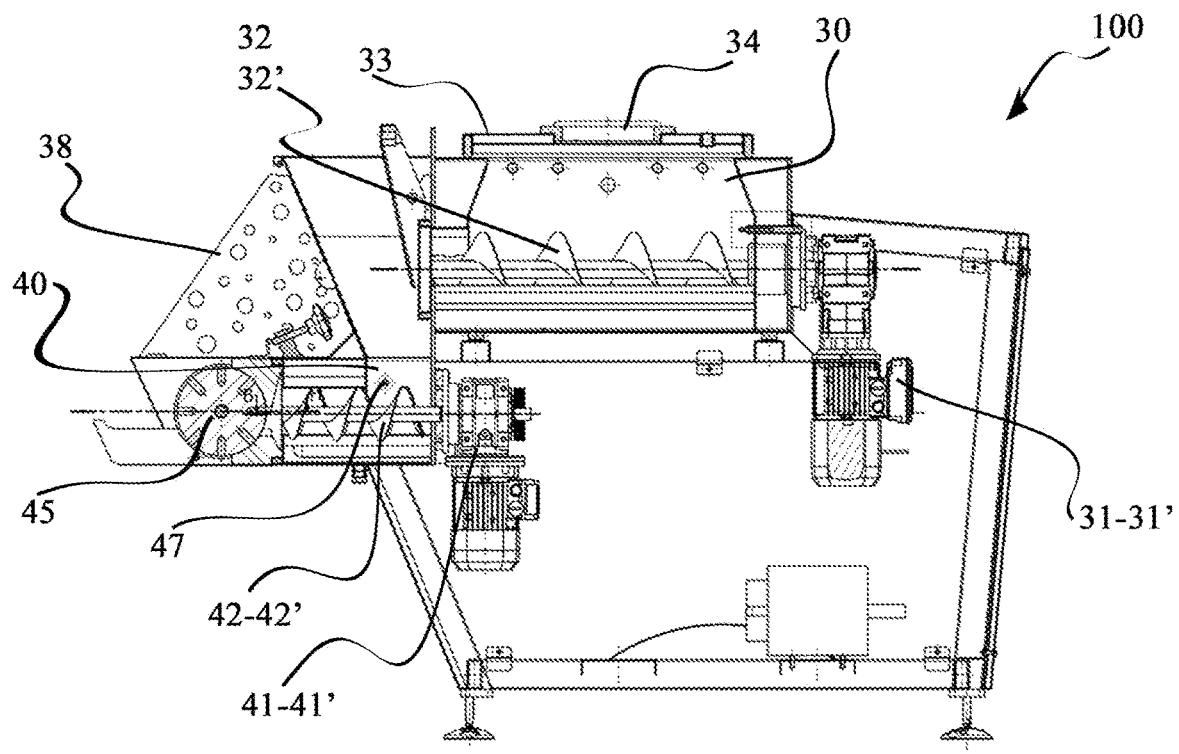
FIG. 3 shows the cross section of the machinery 100 of the previous FIG. 2 in which the spinning and forming cells 40 are clearly visible.
Figure 4:
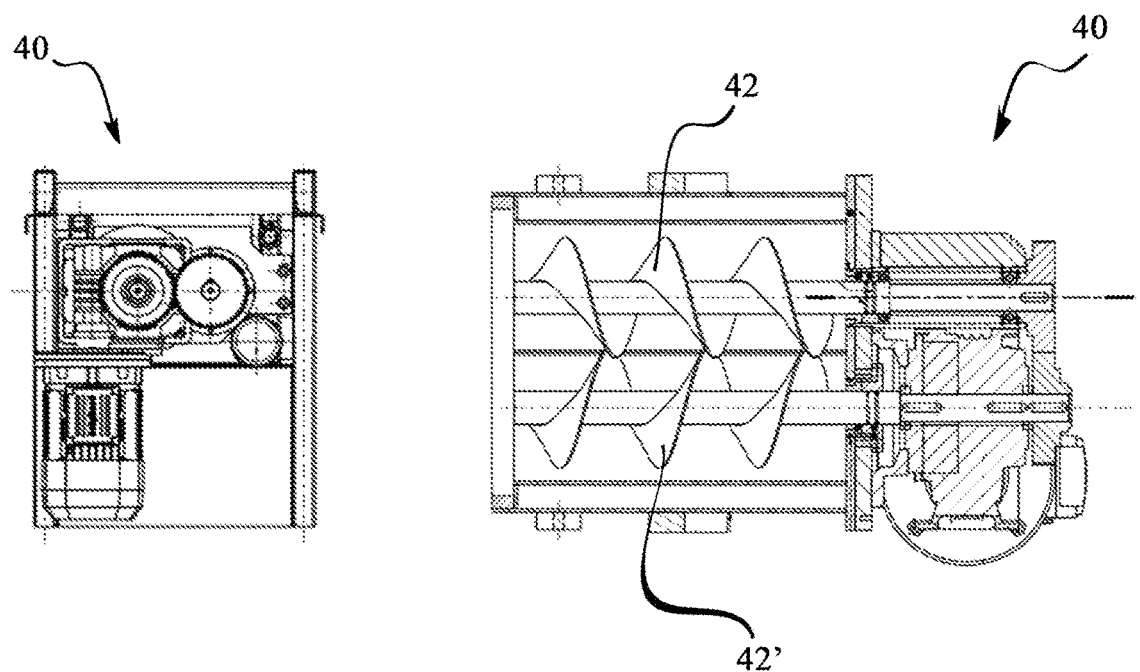
FIG. 4 shows a vertical section (4 (a)) and a horizontal section (4 (b)) of the forming cell 40.
Figure 5:
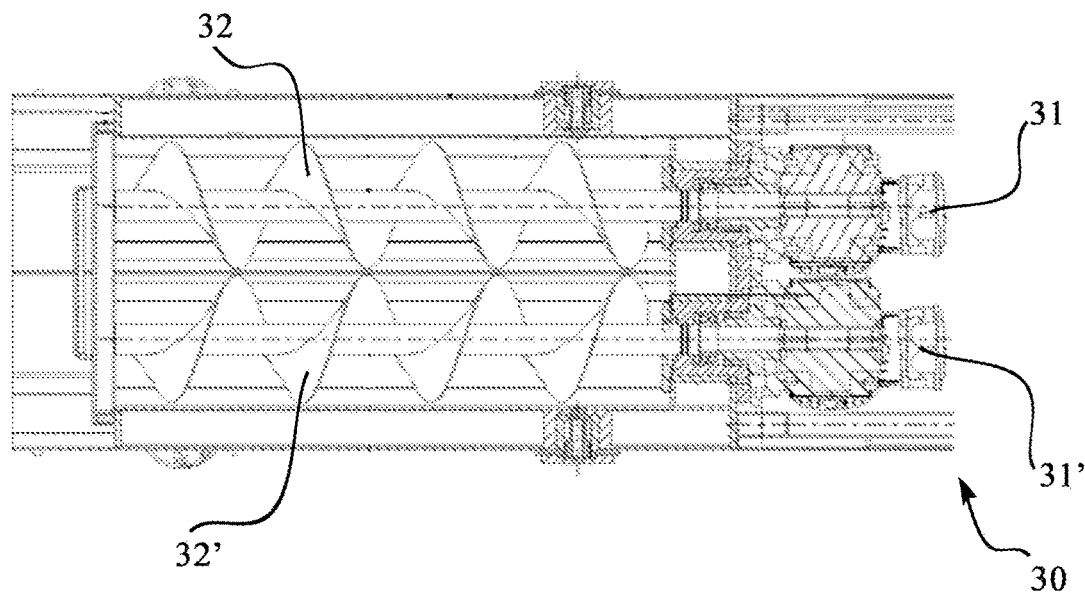
FIG. 5 shows a horizontal section of the spinning cell 30.
Figure 6:
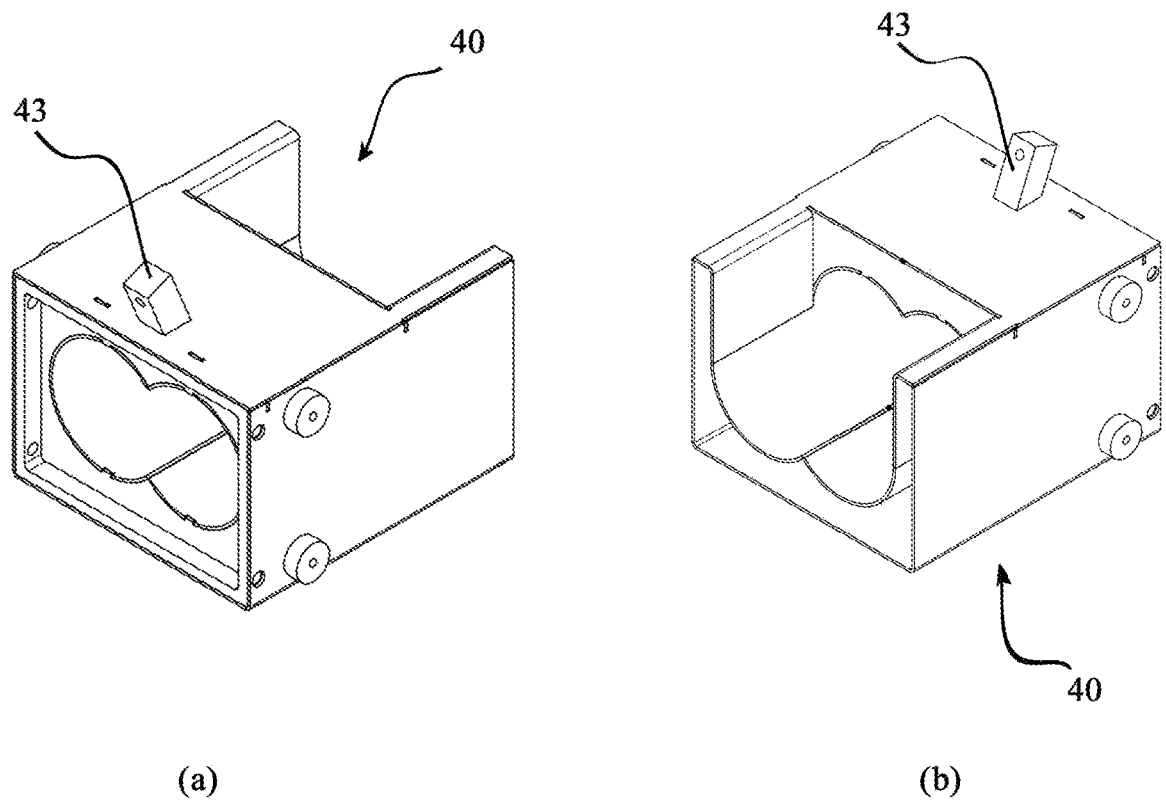
FIG. 6 shows the outer casing of the forming cell 40 with the locking device 43.

As shown in FIG. 2, the spinning cell (30) may also comprise an openable lid (33) provided with a transparent port (34) adapted to allow an operator to visually monitor the spinning of the mixture.

In the spinning step, the raw material is mixed with water and steam at controlled temperatures until the preset temperature and pH are reached, controlled by special additional pH meters and thermometers that communicate with the control unit. The movement is entrusted to augers 32-32', each associated with a timed geared motor 31-31' adapted to move the relative auger 32-32' and therefore the aforementioned mixture for a preset time interval. The augers 32-32', which are bidirectional and independent of each other, are also provided with an energy absorption sensor which, based on the "fatigue" that the augers 32-32' endure for handling the material contained in the spinning cell 30, is able to trace the density of the product. The density data is what determines the moment in which the product must leave the spinning cell 30 since this process step is finished.

Once the spinning process is finished, by means of a fall system 38, the paste is transferred into the forming cell 40 which is provided with at least a pair of coupled bidirectional augers 42-42', each associated with a timed geared motor 41-41' adapted to move the relative auger 42-42' and therefore the aforesaid paste for a preset time interval. The forming cell 40, like the spinning cell 30, is also provided with a pH meter and thermometer 47 which monitor the conditions of the paste and send the data to the control unit which processes the moment in which to operate the augers 42-42' and push the paste in the forming drum 45. The latter can be replaced with others to determine a different shape of the outgoing mozzarella. To secure it to its shaft, there is a common mechanical locking device 43.

Therefore, after loading the preparation tank 10, having chosen the forming drum 45 and having set, through the communication interface 50, the program dedicated to the type of mozzarella to be produced, the operation of the machine 100 is completely automatic.

Finally, it is clear that modifications, additions or variants may be made to the invention described thus far which are obvious to a man skilled in the art, without departing from the scope of protection that is provided by the appended claims.

The invention claimed is:

1. Machinery for the production of pasta filata cheeses, adapted to allow the production of cheeses having all the same organoleptic features and the same flavor, the machinery having a completely automated operation, said machinery comprising within a single frame:
   a preparation cell;
   a spinning cell located downstream the preparation cell;
   a fall system located downstream the spinning cell;
   a forming cell located downstream the fall system;
   a forming drum located downstream the forming cell;
   a control unit loaded with dedicated software that completely automates operation of the machinery and operatively connected to each of the preparation cell, the spinning cell, the fall system, the forming cell, and the forming drum;
   said preparation cell being adapted to receive raw material, the raw material being rennet;
   said preparation cell comprising a thermometer, a pH meter, and a heating system configured to maintain the preparation cell at a first predetermined temperature;
   said preparation cell adapted to move the rennet, having been received within the preparation cell, until the rennet reaches preset temperature and pH values as monitored by the at least one thermometer and the pH meter;
   said preparation cell further being provided with mechanical transfer means for conveying a predetermined amount of the rennet into the spinning cell;
   said spinning cell adapted to receive the predetermined amount of the rennet coming from said preparation cell, move the predetermined amount of rennet, heat the predetermined amount of rennet up to a second predetermined temperature for a given time interval and add water and steam at a second predetermined temperature until a desired paste mixture is obtained;
   said spinning cell being internally provided with at least one pair of bi-directional augers, the pair of augers operating independently, each auger associated with a timed geared motor adapted to independently move the relative auger and thus the paste mixture for a preset time interval;
   each auger being provided with an electrical energy absorption sensor adapted to monitor a density of the paste being processed;
   said spinning cell also comprising an openable lid provided with a transparent port adapted to allow an operator to visually monitor the spinning of the paste mixture;
   said fall system being adapted to collect the paste mixture from the spinning cell and completely transfer the paste mixture from the spinning cell into the forming cell;
   said forming cell adapted to receive the paste mixture coming from said spinning cell through said fall system;
   said forming cell being provided with at least one pair of coupled bi-directional augers, each of the coupled augers associated with a timed geared motor adapted to move the relative auger and thus the paste mixture for a preset time interval;
   said forming cell being further provided with at least one further thermometer adapted to monitor the temperature of said paste mixture determining a moment in which said paste mixture is ready to be pushed by said pair of coupled bi-directional augers into the forming drum to give a desired shape to a finished cheese product and expel the finished cheese product from the machinery;
   said control unit, with said dedicated software, being adapted to collect data coming from timers of the spinning cell and the augers of the spinning cell and of the forming cell, from the thermometers of the preparation cell and the forming cell, and from the pH meter and from the electric energy absorption sensors to monitor conditions of preparation, spinning and forming of said pasta filata cheeses to allow maintenance of quality standards on each cheese produced; and
   a communication interface operatively connected to the control unit and comprising a display adapted for communicating to an operator parameters detected by said control unit.

2. The machinery for the production of pasta filata cheeses, according to claim 1,
   further comprising additional forming drums, a shaft, and a mechanical locking device,
   wherein,
   said forming drum is adapted to engage to a shaft, and
   said forming drum is adapted to be replaced with any one of said additional forming drums adapted to thereby impart a different shape on the finished cheese product;
   said forming drum being secured by said mechanical locking device.

3. The machinery for the production of pasta filata cheeses, according to claim 1, wherein said spinning cell and said forming cell are provided with at least one pH meter adapted to send data on acidity of the paste mixture to said control unit.

4. The machinery for the production of pasta filata cheeses, according to claim 1, wherein said forming cell comprises a plurality of injectors of ingredients, adapted to pierce the cheese being formed to fill the cheese with at least one other ingredient; said injectors being activated by said control unit when the detected temperature of said cheese is within a certain preset range, to allow subsequent closure of the holes made by said injectors.

5. The machinery for the production of pasta filata cheeses, according to claim 1, wherein said preparation cell is also provided with a scale adapted to monitor the quantity of the rennet received, the quantity of added water and the amount of rennet and water mixture conveyed into said spinning cell.

6. The machinery for the production of pasta filata cheeses, according to claim 1, further comprising, upstream of said preparation cell at least one refrigerating cell adapted to store the rennet at a predetermined temperature before transferring a predetermined quantity thereof into said preparation tank cell.

7. The machinery for the production of pasta filata cheeses, according to claim 2, wherein said spinning cell and said forming cell are provided with at least one pH meter adapted to send data on acidity of the paste mixture to said control unit.

8. The machinery for the production of pasta filata cheeses, according to claim 2, wherein said forming cell comprises a plurality of injectors of ingredients, adapted to pierce the cheese being formed to fill the cheese with at least one other ingredient; said injectors being activated by said control unit when the detected temperature of said cheese is within a certain preset range, to allow subsequent closure of the holes made by said injectors.

9. The machinery for the production of pasta filata cheeses, according to claim 3, wherein said forming cell comprises a plurality of injectors of ingredients, adapted to pierce the cheese being formed to fill the cheese with at least one other ingredient; said injectors being activated by said control unit when the detected temperature of said cheese is within a certain preset range, to allow subsequent closure of the holes made by said injectors.

10. The machinery for the production of pasta filata cheeses, according to claim 2, wherein said preparation cell is also provided with a scale adapted to monitor the quantity of the rennet received, the quantity of added water and the amount of the rennet and water mixture conveyed into said spinning cell.

11. The machinery for the production of pasta filata cheeses, according to claim 3, wherein said preparation cell is also provided with a scale adapted to monitor the quantity of the rennet received, the quantity of added water and the amount of the rennet and water mixture conveyed into said spinning cell.

12. The machinery for the production of pasta filata cheeses, according to claim 4, wherein said preparation cell is also provided with a scale adapted to monitor the quantity of the rennet received, the quantity of added water and the amount of the rennet and water mixture conveyed into said spinning cell.

13. The machinery for the production of pasta filata cheeses, according to claim 2, further comprising, upstream of said preparation cell at least one refrigerating cell adapted to store the rennet at a predetermined temperature before transferring a predetermined quantity thereof into said preparation cell.

14. The machinery for the production of pasta filata cheeses, according to claim 3, further comprising, upstream of said preparation cell at least one refrigerating cell adapted to store the rennet at a predetermined temperature before transferring a predetermined quantity thereof into said preparation cell.

15. The machinery for the production of pasta filata cheeses, according to claim 4, further comprising, upstream of said preparation cell at least one refrigerating cell adapted to store the rennet at a predetermined temperature before transferring a predetermined quantity thereof into said preparation cell.

16. The machinery for the production of pasta filata cheeses, according to claim 5, further comprising, upstream of said preparation cell at least one refrigerating cell adapted to store the rennet at a predetermined temperature before transferring a predetermined quantity thereof into said preparation cell.

17. The machinery for the production of pasta filata cheeses, according to claim 7, wherein said forming cell comprises a plurality of injectors of ingredients, adapted to pierce the cheese being formed to fill the cheese with at least one other ingredient; said injectors being activated by said control unit when the detected temperature of said cheese is within a certain preset range, to allow subsequent closure of the holes made by said injectors.

18. The machinery for the production of pasta filata cheeses, according to claim 7, wherein said preparation tank cell is also provided with a scale adapted to monitor the quantity of the rennet received, the quantity of added water and the amount of the rennet and water mixture conveyed into said spinning cell.

19. A method of producing pasta filata cheeses, comprising:
    operating the machinery of claim 1;
    loading the preparation cell with a predetermined amount of rennet;
    establishing and maintaining the first preset temperature of the preparation cell;
    via said communication interface, establishing the preset temperature and pH values of the rennet within the preparation cell;
    upon reaching the preset temperature and pH values of the rennet within the preparation cell, automatically transferring the predetermined amount of the rennet into the spinning cell;
    selecting a preset program, through the communication interface for production of a desired type of pasta filata as the finished cheese product;
    selecting and assembling the forming drum to make the desired shape of the finish cheese product in production;
    starting the machinery, through said communication interface and visually monitoring the spinning and forming steps, said steps taking place automatically according to the preset parameters.

20. The method of producing pasta filata cheeses, according to claim 19, further comprising, prior to said loading step, a step of storing the predetermined amount of the rennet in at least one negative or positive refrigerating cell, from which an automatic mechanism withdraws the predetermined amount of the rennet and transfers the predetermined amount of the rennet into said preparation cell.

\* \* \* \* \*